United States Patent
Alvarez, II et al.

(10) Patent No.: US 6,510,471 B1
(45) Date of Patent: Jan. 21, 2003

(54) METHOD FOR CHOOSING DEVICE AMONG PLURALITY OF DEVICES BASED ON COHERNCY STATUS OF DEVICE'S DATA AND IF DEVICE SUPPORTS HIGHER-PERFORMANCE TRANSACTIONS

(75) Inventors: Manuel Joseph Alvarez, II, Austin, TX (US); Kenneth Douglas Klapproth, Austin, TX (US); David Mui, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,838

(22) Filed: Sep. 9, 1999

(51) Int. Cl.[7] ............................. G06F 13/00; G06F 3/00
(52) U.S. Cl. ............................. 710/33; 710/11; 710/14; 710/31; 710/38; 709/238
(58) Field of Search ............................. 710/11, 14, 33, 710/31, 38; 709/238

(56) References Cited

U.S. PATENT DOCUMENTS

| | | | | |
|---|---|---|---|---|
| 5,983,306 A | * | 11/1999 | Corrigan et al. ............ | 710/129 |
| 6,014,690 A | * | 1/2000 | VanDoren et al. .......... | 709/215 |
| 6,219,690 B1 | * | 4/2001 | Slingwine et al. .......... | 709/102 |

* cited by examiner

Primary Examiner—Thomas Lee
Assistant Examiner—Tammara Peyton
(74) Attorney, Agent, or Firm—Duke W. Yee; Volel Emile; Michael R. Nichols (57) ABSTRACT

A method of transferring data between devices in a computer system. In a preferred embodiment, a requesting device broadcasts a request for data to other devices in the computer system. The computer system identifies, from a plurality of responding devices within the computer system, a target device that contains the data. In response to a determination that the target device does not support higher-performance transactions, the computer system disables higher-performance transactions and transfers the data to the requesting device via a lower-performance transaction process.

24 Claims, 6 Drawing Sheets

| ENCODED TRANSACTION STATUS (0:1) | PRIORITY | DEFINITION |
|---|---|---|
| 00 | 1 | AStat_Parity_Err |
| 01 | 2 | AStat_Retry |
| 10 | 3 | AStat_Acknowledge |
| 11 | 4 | AStat_Null |

*FIG. 5*

| ENCODED TRANSACTION COHERENCY RESPONSE (0:2) | PRIORITY | DEFINITION |
|---|---|---|
| 100 | 1 | AResp_Retry |
| 101 | 2 | AResp_Modified-Intervention |
| 001 | 3 | AResp_Shared-Intervention |
| 110 | 4 | AResp_Shared |
| 111 | 5 | AResp_Null |
| 011, 000, 010 | – | Reserved |

*FIG. 6*

| AGGREGATE OF TRANSACTION COHERENCY RESPONSES | | | | | RESPONSE GLOBAL TRANSACTION CONTROL SIGNAL | COHERENCY RESPONSE |
|---|---|---|---|---|---|---|
| RETRY | MODIFIED INTERVENTION | SHARED INTERVENTION | SHARED | NULL | | |
| 1 | x | x | x | x | x | AResp_Retry |
| 0 | 1 | x | x | x | x | AResp_Modified-Intervention |
| 0 | 0 | 1 | x | x | 0 | AResp_Shared-Intervention |
| 0 | 0 | 1 | x | x | 1 | AResp_Shared |
| 0 | 0 | 0 | 1 | x | x | AResp_Shared |
| 0 | 0 | 0 | 0 | 1 | x | AResp_Null |

METHOD FOR CHOOSING DEVICE AMONG PLURALITY OF DEVICES BASED ON COHERNCY STATUS OF DEVICE'S DATA AND IF DEVICE SUPPORTS HIGHER-PERFORMANCE TRANSACTIONS

BACKGROUND OF THE INVENTION

1. Technical Field

The present invention relates to the field of computer software and, more particularly, to methods of transferring data between bus devices.

2. Description of Related Art

On a multi-processor bus with a split response protocol, the first phase of the response indicates successful receipt of the bus transaction and the device that is the target of the transaction. The second and final phase of the response is when the attached bus devices report the cache-coherency state of the target address.

When different types of devices are attached to the same bus (i.e. compute processors along with I/O processors), the set of bus transactions supported is usually the least common denominator of all of the attached devices. This often results in higher-performance transaction types being disabled in a system because of a single lower-performance device on the bus that does not support those transactions. The potential performance loss is magnified when the low-performance device is accessed infrequently (i.e. the majority of transactions are between devices which all support the higher performance transaction types but which must be disabled).

Therefore, there is a need for a mechanism where higher-performance transaction types can be supported within a system containing different types of devices, even though not all devices on the bus support those transaction types.

SUMMARY OF THE INVENTION

The present invention provides a method of transferring data between devices in a computer system. In a preferred embodiment, a requesting device broadcasts a request for data to other devices in the computer system. The computer-system identifies, from a plurality of responding devices within the computer system, a target device that contains the data. In response to a determination that the target device does not support higher-performance transactions, the computer system disables higher-performance transactions and transfers the data to the requesting device via a lower-performance transaction process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method of transferring data between processors and may be implemented within a single data processing system containing multiple nodes, each having multiple processors. Throughout this description, the term "processor" refers to either computational processors or Input/Output (I/O) processors. In both cases, processors are assumed (but not required) to incorporate an internal or local cache.

Figure 1:
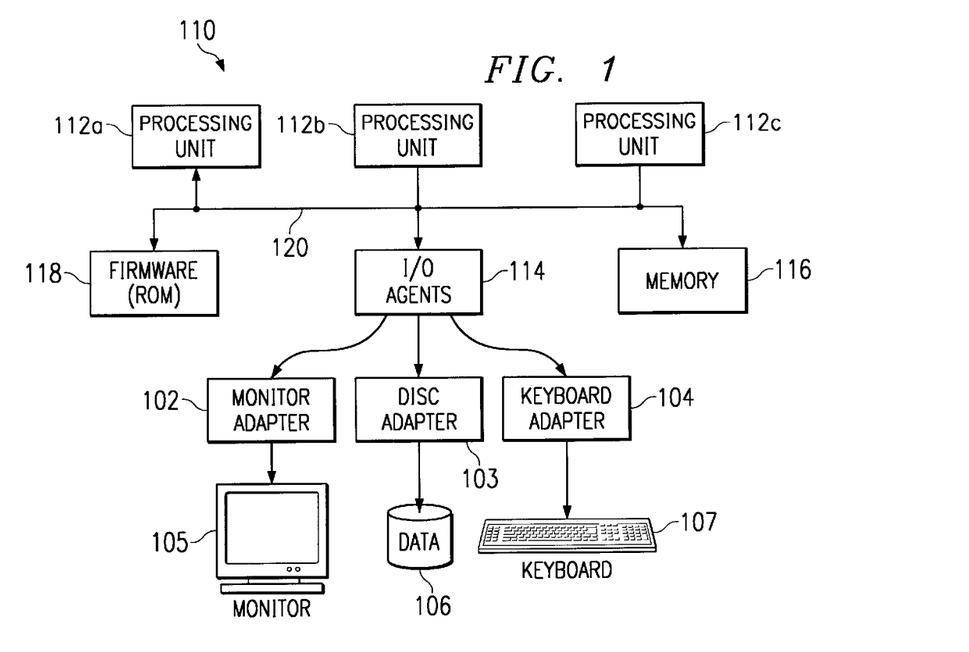
FIG. 1 depicts the basic structure of a conventional multiprocessor computer system in which the present invention may be implemented.

With reference now to the figures, and in particular with reference to FIG. 1, the basic structure of a conventional multiprocessor computer system 110 is depicted, in which the present invention may be implemented. Computer system 110 has several processing units 112a, 112b and 112c, which are connected to various peripheral devices, including input/output (I/O) agents 114, which accept data from and provide data to a monitor adapter 102 and display monitor 105, keyboard adapter 104 and keyboard 107, and disk adapter 103 and permanent storage device 106, memory device 116 (such as dynamic random access memory, or DRAM), which is used by the processing units to carry out program instructions, and firmware 118, whose primary purpose is to seek out and load an operating system from one of the peripherals (usually the permanent memory device) whenever the computer is first turned on. Processing units 112a–112c communicate with the peripheral devices by various means, including bus 120. Computer system 110 may have many additional components which are not shown, such as serial and parallel ports for connection to peripheral devices, such as modems or printers. Those skilled in the art will further appreciate that there are other components that might be used in conjunction with those shown in the block diagram of FIG. 1. For example, a display adapter might be used to control a video display monitor; a memory controller can be used to access memory 116; etc. In addition, computer system 110 may be configured with more or fewer processors. Other embodiments of the present invention may be implemented in other types of data processing systems, such as mainframes, servers, workstations, network computers, Internet appliances, palm computers, etc.

In a symmetric multiprocessor (SMP) computer, all of the processing units 112a–112c are generally identical; that is, they all use a common set or subset of instructions and protocols to operate and generally have the same architecture.

Figure 2:
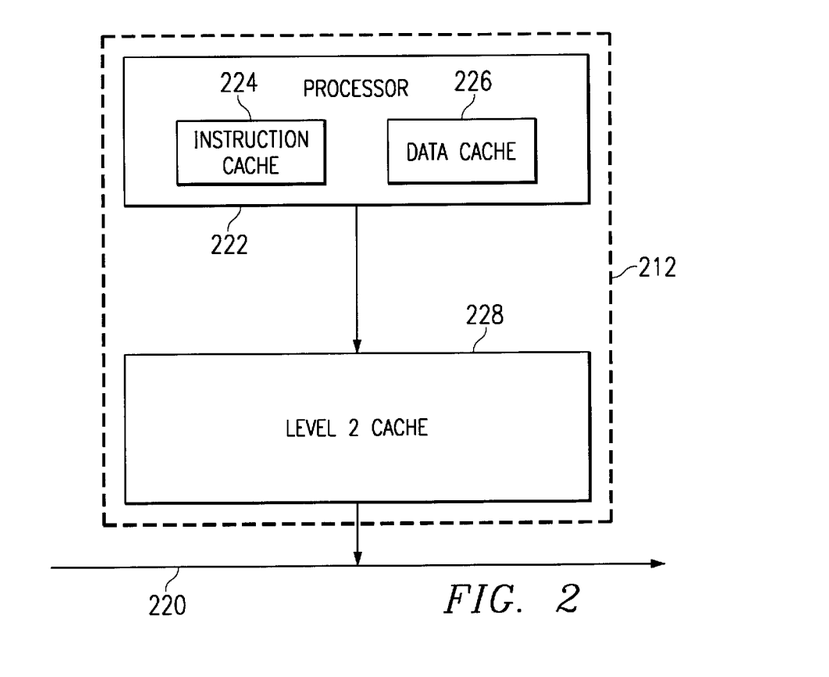
FIG. 2 depicts a typical organization of a processor, depicted in accordance with the present invention.

With reference now to FIG. 2, a typical organization of a processor is depicted in accordance with the present invention. A processing unit 212 includes a processor 222 having a plurality of registers and execution units which carry out program instructions in order to operate the computer. The processor can also have caches, such as an instruction cache 224 and a data cache 226. These caches are referred to as "on-board" when they are integrally packaged with the processor's registers and execution units. Caches are commonly used to temporarily store values that might be repeatedly accessed by a processor, in order to speed up processing by avoiding the longer step of loading the values from memory, such as memory 116 shown in FIG. 1.

Processing unit 212 can include additional caches, such as cache 228. Cache 228 is referred to as a level 2 (L2) cache since it supports the on-board (level 1) caches 224 and 226. In other words, cache 228 acts as an intermediary between memory 116 and the on-board caches, and can store a much larger amount of information (instructions and data) than the on-board caches, although at a longer access penalty. For example, cache 228 may be a chip having a storage capacity of 256 or 512 kilobytes, while the processor 212 may be an IBM PowerPC™ Power3-series processor having on-board caches with 96 kilobytes of total storage. Cache 228 is connected to bus 220, and all loading of information from memory 116 into processor 212 must come through cache 228. Although FIG. 2 depicts only a two-level cache hierarchy, multi-level cache hierarchies can be provided where there are many levels of serially connected caches.

Figure 3:
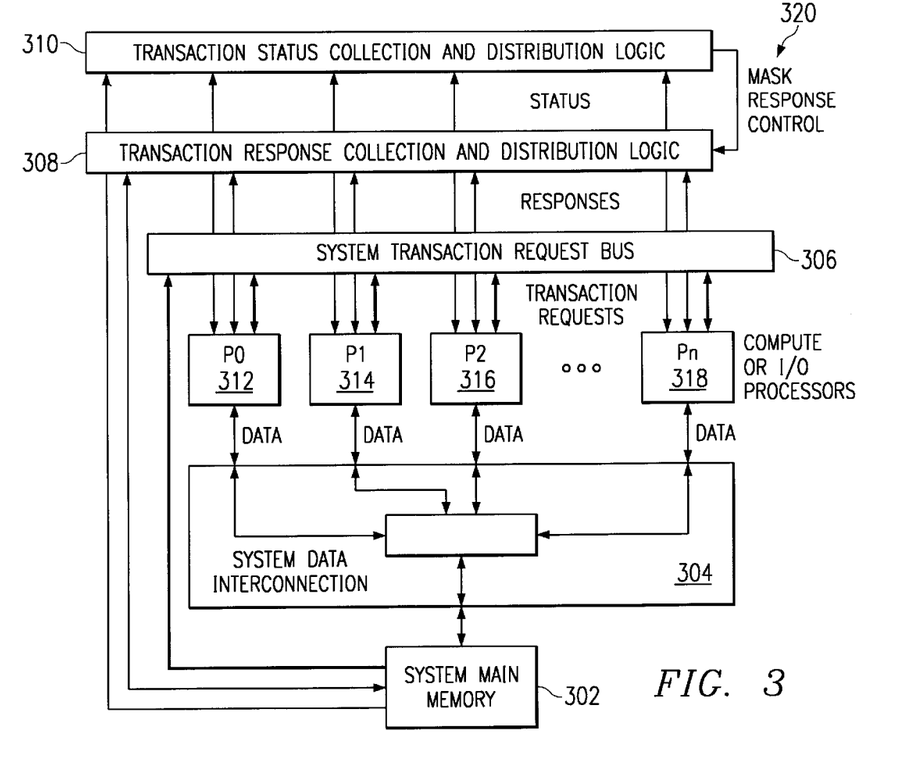
FIG. 3 shows a block diagram illustrating multiple processors connected to a main memory system in accordance with the present invention.

Turning now to FIG. 3, there is shown a block diagram illustrating multiple processors connected to a main memory system in accordance with the present invention. The system consists of one to "n" processor devices 312, 314, 316 and 318, which may each be either a computational processor or an I/O interface processor. Individual processor devices may or may not contain internal and/or attached caches.

A functionally common transaction request bus 306 connects to all processors P0, P1, P2 and Pn, and to main memory 302. It affords each processor P0, P1, P2 and Pn visibility to every other processor's requests for data to assure cache coherency is maintained.

Each transaction request that is broadcast to the system via transaction request bus 306 requires a two-phase response from all devices attached to the bus (P0, P1, P2, Pn, and main memory). The first phase, referred to herein as the transaction status phase, is where the bus devices indicate the successful receipt of the transaction request. The second phase, referred to herein as the transaction coherency response phase, is when each of the bus devices indicate the coherency status of the request within their internal and/or attached caches.

A transaction status collection and distribution unit 310 collects the transaction status information from each processor P0, P1, P2 and Pn, as well as main memory. It evaluates all of the status condition and then communicates that status back to each processor P0, P1, P2, Pn and main memory.

A response collection and distribution unit 308 collects the cache coherency responses from each of the processors P0, P1, P2 and Pn in the system and from main memory. It evaluates the individual responses to determine which aggregate response type is required to preserve coherency in the system. It then communicates that response back to each processor P0, P1, P2 and Pn and main memory.

Processors P0, P1, P2 and Pn pass data between each other and to main memory 302 via a system data interconnection network 304, which may be either a common shared bus, a crossbar switching network, or some other interconnection network.

Figure 4:
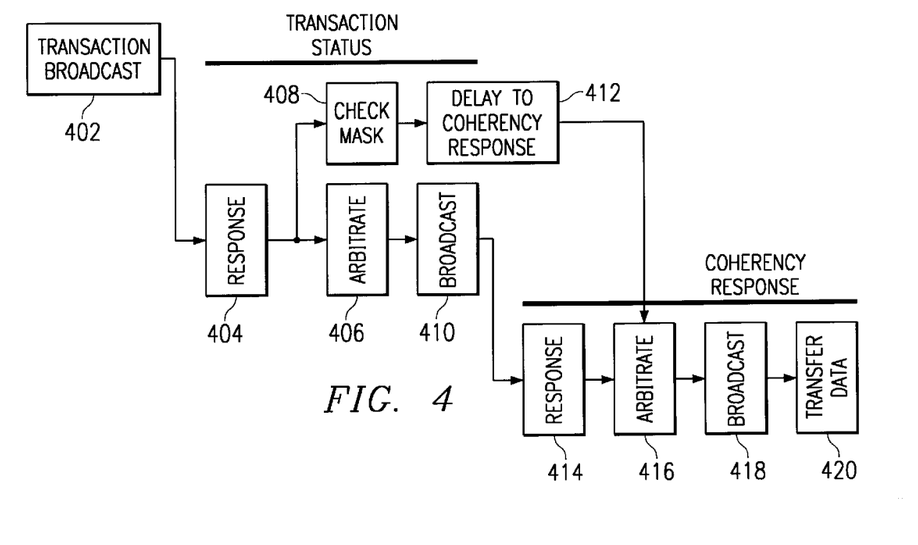
FIG. 4 depicts a block diagram illustrating the two-phase response sequence in accordance with the present invention.

Turning now to FIG. 4, a block diagram is depicted, illustrating the two-phase response sequence in accordance with the present invention. A transaction is broadcast (step 402) by the initiating processor to all of the other processors and main memory.

All of the devices attached to the System Transaction Request bus sample the transaction and decode it to verify correct receipt of the transaction and to determine the destination (i.e. target) of the request. All of the devices provide the result of the transaction decode operation as the transaction status response (step 404).

Figure 5:
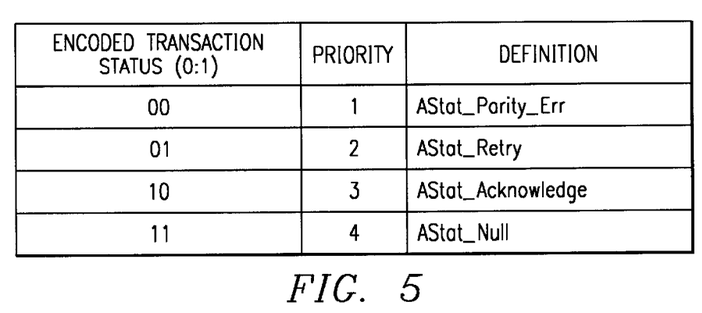
FIG. 5 shows a table defining one possible set of transaction status responses and their relative priorities in accordance with the present invention.

The table illustrated in FIG. 5 defines one possible set of transaction status responses and their relative priorities. The highest priority status condition, AStat_Parity_Err, is reported when a bus device detects a parity or uncorrectable ecc error in the received transaction and, therefore, is unable to process the transaction request. The AStat_Parity_Err status effectively terminates the transaction request and generally results in a system fault.

The second highest priority status condition, AStat_Retry, is reported when a bus device is busy and cannot decode the transaction in time to provide status when the system expects it. The AStat_Retry status effectively terminates the transaction request. Therefore, the requesting processor must re-issue the request at a later time.

The third status condition, AStat_Acknowledge, is provided by the single bus device that has successfully decoded the transaction and determined that it is the owner of the requested memory address (i.e. it is the target device for the request).

The lowest priority status, AStat_Null, is provided by bus devices that have successfully decoded the transaction and determined that they are not the owners.

Note that the set of status responses in any given system can have more or fewer status conditions, but an AStat_Acknowledge status and AStat_Null status, or corollaries thereof, are a requirement.

Returning now to FIG. 4, the status collection logic samples the status information from all of the bus devices at the appropriate time, selects the highest priority status from among the received status conditions (step 406), and then broadcasts the highest priority status to all bus devices (step 410).

Additionally, the status collection logic determines which bus device responded with an Acknowledge status. It then selects a corresponding response mask control bit from a programmable register containing individual mask control bits for each bus device (step 408). The selected mask control bit, if active, indicates that the target device supports only a restricted sub-set of the possible transaction coherency responses. The selected mask control bit is then delayed (step 412) and provided to the transaction coherency response collection logic during the coherency response phase for the corresponding transaction.

The next phase in the two-phase response sequence is the coherency response phase. In this phase, each bus device examines its internal and/or attached caches to determine if the requested data is present within its caches and, if so, the coherency state of the data. The result of this process is provided as the transaction coherency response (step 414).

Figure 6:
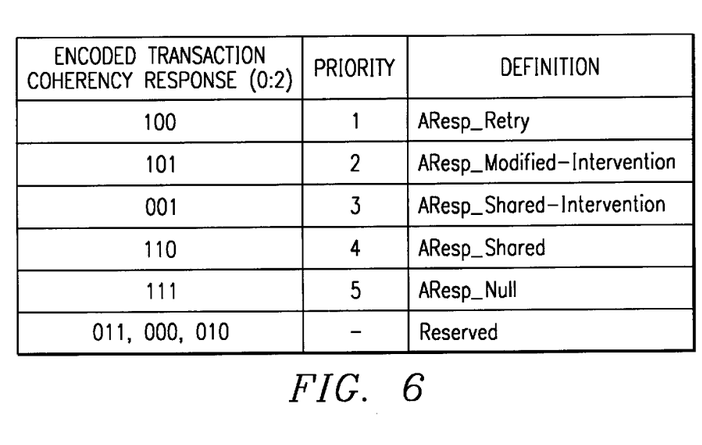
FIG. 6 shows a table defining one possible set of transaction coherency response conditions and their relative priorities in accordance with the present invention.

The table illustrated in FIG. 6 defines one possible set of transaction coherency response conditions and their relative priorities. Note that the set of coherency responses in any given system can have more or fewer response conditions.

As shown in FIG. 6, the highest priority coherency response condition, AResp_Retry, indicates that a bus device is busy and unable to process the request in time to provide status when the system expects it. The AResp_Retry status effectively terminates the transaction request. Therefore, the requesting processor must re-issue the request at a later time.

The second highest priority coherency response, AResp_Modified_Intervention, is generated by a bus device that has determined that the requested data is resident within its internal and/or attached caches and that the data has been modified since it was copied from memory. In this situation, the device with the modified data must intervene in the data transfer between the target device for the request and the requesting device. The device with the modified data can either send the data directly to the requesting device via a cache-to-cache transaction or it can copy the modified data to memory, which then provides the data to the requesting device.

The third and fourth highest priority coherency responses, AResp_Shared_Intervention and AResp_Shared (respectively), both indicate that a bus device has determined that the requested data is resident within its internal and/or attached caches and that the data has not been modified since it was copied from memory. The difference between the two responses is that the AResp_Shared_Intervention is generated by a bus device to indicate that it is able to intervene in the data transfer from the target device to the requesting device and to provide the data directly via a cache-to-cache data transfer. If the target device for the transaction is main memory, a cache-to-cache transaction between processors can generally be performed faster than accessing the data from main memory. The simple AResp_Shared response indicates that a device has an unmodified copy of the requested data but is unable or unwilling to intervene and participate in a cache-to-cache data transfer.

The lowest priority coherency response, AResp_Null, is generated by a bus device to indicate that it does not have a copy of the requested data within its internal and/or attached caches and, therefore, will not be involved in the subsequent data transfer operation.

Returning now to FIG. 4, the coherency response collection logic samples the responses mask control signal from the status collection logic, along with the coherency responses from all of the bus devices at the appropriate time, and selects the appropriate coherency response (step 416). Finally, the distribution logic broadcasts appropriate coherency responses to all bus devices (step 418).

Figure 7:
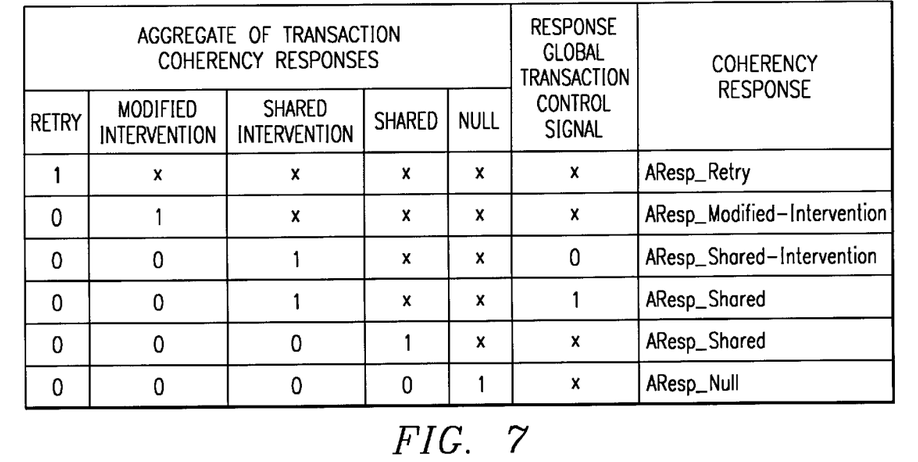
FIG. 7 shows a table used to determine the combined AResp condition from a single 6-bit prioritized ARespOut vector in accordance with the present invention.

The table illustrated in FIG. 7 defines a possible coherency response priority selection algorithm, which invokes an alternative response if the target device has been identified (via the response mask control mechanism) as a device that does not support the full set of coherency responses.

As shown in FIG. 7, the aggregate (i.e. sum) of all received coherency responses is ordered from highest to lowest priority. Except for the AResp_Shared_Intervention case, the algorithm simply selects the highest priority received response as the resulting global coherency response.

In a typical system, there is usually a variety of computational and I/O bus devices/processors attached to the system bus. Some devices, commonly I/O interface devices, may not allow copies of data from their memory space to be transferred directly between processors, as would be the case in an AResp_Shared_Intervention situation. In this situation, a global coherency response result of AResp_Shared is necessary to block the intervention and allow the target device to supply the requested data.

As shown in FIG. 7, if the highest priority coherency response received is AResp_Shared_Intervention, and the response mask control bit is active, indicating that the target device does not allow AResp_Shared_Interventions for its memory space, then the final global coherency response is forced to AResp_Shared to block the intervention by another bus device.

Returning now to FIG. 4, to complete the transaction, the associated data is transferred between the device that requested the transaction and either the target device for the request or an intervening device (step 420).

Figure 8:
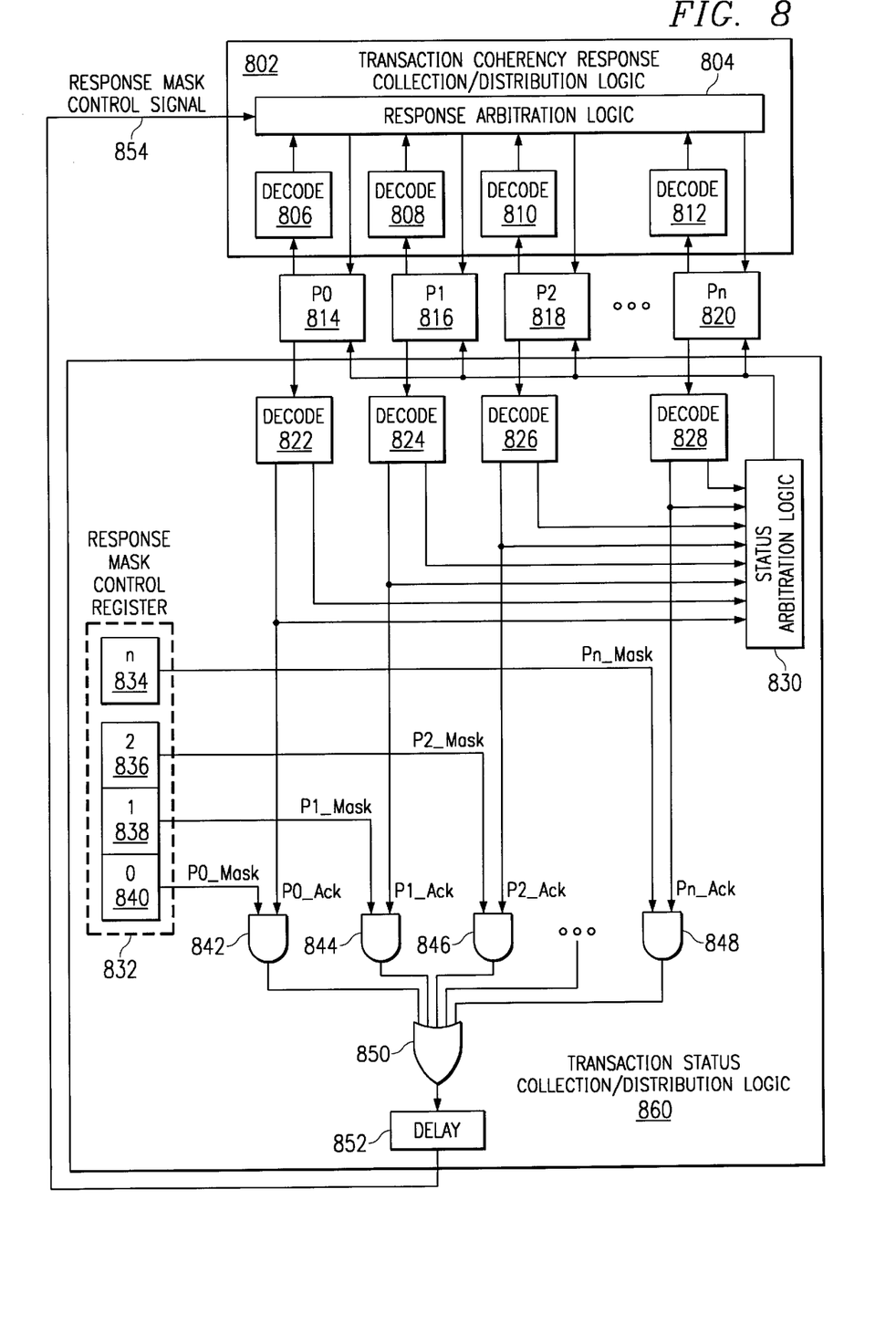
FIG. 8 depicts a detailed block diagram of a transaction status collection and distribution logic 310, and a transaction response collection and distribution logic 308, in accordance with a preferred embodiment of the present invention.

Turning now to FIG. 8, a detailed block diagram of a transaction status collection and distribution logic 310, and a transaction response collection and distribution logic 308, is depicted in accordance with the present invention.

Processors 814, 816, 818 and 820 each have a binary-encoded transaction status output connected to respective decoders 822, 824, 826 and 828 within transaction status collection/distribution logic block 860. The use of encoded status information reduces the number of signals required between processors 814, 816, 818 and 820 and the status collection and distribution unit 860.

Each decoder 822, 824, 826 and 828 has an individual output for every transaction status condition, of which one must be a target acknowledgment status. All of the address status condition outputs from each decoder 822, 824, 826 and 828 are fed into status arbitration logic block 830. Additionally, the decoded status acknowledgment output from each decoder 822, 8:24, 826 and 828 is also provided to respective "AND" gates 842, 844, 846 and 848.

Status arbitration logic 830 selects the highest priority status condition from among all of the decoded status inputs from decoders 822, 824, 826 and 828. The highest priority response is fed back into each of processors 814, 816, 818 and 820 via a binary-encoded output from status arbitration logic block 830.

A programmable response mask control register 832 defines which processors 814, 816, 818 and 820 should not receive a given coherency response when they are the target of a transaction. For each processor 814, 816, 818 and 820, a single bit within response mask control register 832, when set active ("1"), indicates that the corresponding processor is not able to receive the given coherency response. The appropriate mask control outputs Hi from response mask control register 832 are provided to respective "AND" gates 842, 844, 846 and 848.

Each of "AND" gates 842, 844, 846 and 848 has two inputs. One input for each of "AND" gates 842, 844, 846 and 848 comes, as stated above, from the decoded acknowledgment status output of respective decoders 822, 824, 826 and 828. The other input for each of "AND" gates 842, 844, 846 and 848 comes from respective outputs 834, 836, 838 and 840 from response mask control register 832. The output from each of "AND" gates 842, 844, 846 and 848 is fed into "OR" 850.

The function of "AND" gates 842, 844, 846 and 848 and "OR" 850 is to select the appropriate response mask control bit 834, 836, 838 and 840 for the single processor that indicates it is the target device for the transaction request (as identified by the single active acknowledge status decode from decoders 822, 824, 826 and 828). An active (i.e. "1") output from "OR" block 850 indicates that the target processor for the transaction is not able to receive the restricted coherency response type.

The output from "OR" block 850 is fed into a delay 852 from which response mask control signal 854 emerges. With a two-phase response protocol, the transaction status phase occurs earlier in time relative to the transaction coherency response phase. The function of delay unit 852 is to delay the transaction coherency response control signal, which is generated during the transaction status phase, so that it is aligned with the transaction coherency response phase for the corresponding transaction.

Transaction response collection/distribution logic 802 includes a response arbitration logic block 804 and 15 up to "n" decoders 806, 808, 810 and 812. Decoders 806, 808, 810 and 812 each receives as an input a binary-encoded transaction coherency response from processors 814, 816, 818 and 820, respectively. The use of encoded coherency response information reduces the number of signals required between processors 814, 816, 818 and 820 and response collection and distribution unit 802.

Each decoder 806, 808, 810 and 812 has an individual output for every transaction coherency response condition. All of the decoded transaction coherency response outputs from each decoder 806, 808, 810 and 812 are fed into response arbitration logic block 804. Response arbitration logic 804 also accepts a response mask control signal 854 from address status collection/distribution logic block 860 as an input.

Transaction coherency response arbitration logic 804 selects the highest priority coherency response condition from among all of the decoded response inputs from decoders 806, 808, 810 and 812. Depending on state of response mask control input 854, the resulting highest priority cache coherency response, or an alternative response, is fed back into each of processors 8.14, 816, 818 and 820 via a binary-encoded output from the response arbitration logic block 804.

Turning now to FIG. 9, a flowchart illustrating a preferred method of implementing the present invention is depicted. A transaction request is broadcast to all bus devices via a common transaction request bus (step 902). Each bus device receives and decodes the transaction in order to provide the correct transaction receipt status to the status collection logic (step 904). All bus devices provide their individual transaction receipt status responses to the status collection logic (step 906). The single bus device which has decoded the address and determined that it is the owner/target of the requested address location generates an acknowledge status response (step 908). The status collection logic decodes each of the transaction receipt status responses (step 910).

The status collection logic determines the highest priority status response and then broadcasts that response to all bus devices (step 912). All bus devices receive the final transaction receipt status. If so indicated, they will either terminate the request and return to step 902 or proceed to process the request (step 914).

If it is determined to proceed with the request, then all bus devices with internal or attached caches interrogate their caches to determine the cache coherency status of the requested address within their caches (step 916). All bus devices provide their individual cache coherency response to the coherency response collection logic (step 918).

Parallel mask logic processing occurs simultaneously with steps 912–918. In this process, the acknowledge status response from each bus device is provided to the transaction response mask logic (step 926). The response mask logic selects the appropriate bit in the response mask register corresponding to the bus device which generated the acknowledge status response (step 928). If the mask bit is enabled (i.e. "1"), the n response mask control signal is activated. Otherwise, the mask control signal is left inactive (step 930). The mask control signal is delayed by the appropriate number of clock cycles to adjust for the time delay between the status response state and the coherency response state (step 932). The response mask control signal is provided to the coherency response collection logic (step 934).

After all bus devices have provided their individual cache coherency responses to the coherency response collection logic, and after the response mask control signal is provided to the coherency response collection logic, the coherency response collection logic determines the correct coherency response for the transaction. If the response mask control bit is set, the specified response type is not generated and an appropriate alternate response is generated (i.e. Shared Intervention is replaced with simple Shared) (step 920). Coherency response logic provides each bus device with the appropriate response (step 922). Based on the final coherency response state, the appropriate bus devices complete the transaction. Next, the process begins anew with step 902.

It is important to note that, while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of transferring data between devices in a computer system, comprising the steps of:

broadcasting a request for data from a requesting device to a plurality of devices;

receiving, from the plurality of devices, coherency responses corresponding to the status of the data with respect to each of the plurality of devices;

identifying, from the plurality of devices, a target device;

determining whether the target device supports higher-performance transactions;

choosing, based on the coherency responses and whether the target device supports higher-performance transactions, an appropriate transaction process and an appropriate device from the plurality of devices from which to transfer the data; and transferring the data from the appropriate device using the appropriate transaction process.

2. The method as recited in claim 1, wherein the target device is an input/output processor.

3. The method as recited in claim 1, wherein the requesting device is a processor.

4. The method as recited in claim 1, wherein at least one of the plurality of devices is a main memory unit.

5. The method as recited in claim 1, wherein at least one of the plurality of devices is a computer processor.

6. The method as recited in claim 1, further comprising, responsive to a determination that the target device supports a higher-performance transactions, transferring the data to the requesting device via the higher-performance transactions.

7. The method as recited in claim 6, wherein the one of the higher performance transactions is a cache-to-cache data transfer.

8. The method as recited in claim 1, wherein the appropriate transaction process is a data transfer from main memory.

9. A computer program product in computer readable media for use in a data processing system for transferring data between devices in a computer system, the computer program product comprising:

first instructions for broadcasting a request for data from a requesting device to a plurality of devices;

second instructions for identifying, from the plurality of devices, a target device;

third instructions for receiving, from the plurality of devices, coherency responses corresponding to the status of the data with respect to each of the plurality of devices;

fourth instructions for determining whether the target device supports higher-performance transactions;

fifth instructions for choosing, based on the coherency responses and Whether the target device supports higher-performance transactions, an appropriate transaction process and an appropriate device from the plurality of devices from which to transfer the data; and sixth instructions for transferring the data from the appropriate device using the appropriate transaction process.

10. The computer program product as recited in claim 9, wherein the target device is an input/output processor.

11. The computer program product as recited in claim 9, wherein the requesting device is a processor.

12. The computer program product as recited in claim 9, wherein at least one of the plurality of devices is a main memory unit.

13. The computer program product as recited in claim 9, wherein at least one of the plurality of devices is a computer processor.

14. The computer program product as recited in claim 9, further comprising seventh instructions, responsive to a determination that the target device supports a higher-performance transactions, for transferring the data to the requesting device via the higher-performance transactions.

15. The computer program product as recited in claim 14, wherein the one of the higher performance transactions is a cache-to-cache data transfer.

16. The computer program product as recited in claim 9, wherein the appropriate transaction process is a data transfer from main memory.

17. A system for transferring data between devices in a computer system, the system comprising:

means for broadcasting a request for data from a requesting device to a plurality of devices;

means for receiving, from the plurality of devices, coherency responses corresponding to the status of the data with respect to each of the plurality of devices;

means for identifying, from the plurality of devices, a target device;

means for determining whether the target device supports higher-performance transactions;

means for choosing, based on the coherency responses and whether the target device supports higher-performance transactions, an appropriate transaction process and an appropriate device from the plurality of devices from which to transfer the data; and means for transferring the data from the appropriate device using the appropriate transaction process.

18. The system as recited in claim 17, wherein the target device is an input/output processor.

19. The system as recited in claim 17, wherein the requesting device is a processor.

20. The system as recited in claim 17, wherein at least one of the plurality of devices is a main memory unit.

21. The system as recited in claim 17, wherein at least one of the plurality of devices is a computer processor.

22. The system as recited in claim 17, further comprising means, responsive to a determination that the target device supports a higher-performance transactions, for transferring the data to the requesting device via the higher-performance transactions.

23. The system as recited in claim 22, wherein the one of the higher performance transactions is a cache-to-cache data transfer.

24. The system as recited in claim 17, wherein the appropriate transaction process is a data transfer from main memory.

* * * * *

UNITED STATES PATENT AND TRADEMARK OFFICE
CERTIFICATE OF CORRECTION

PATENT NO.    : 6,510,471 B1
DATED         : January 21, 2003
INVENTOR(S)   : Alvarez, II et al.

Figure 9A:
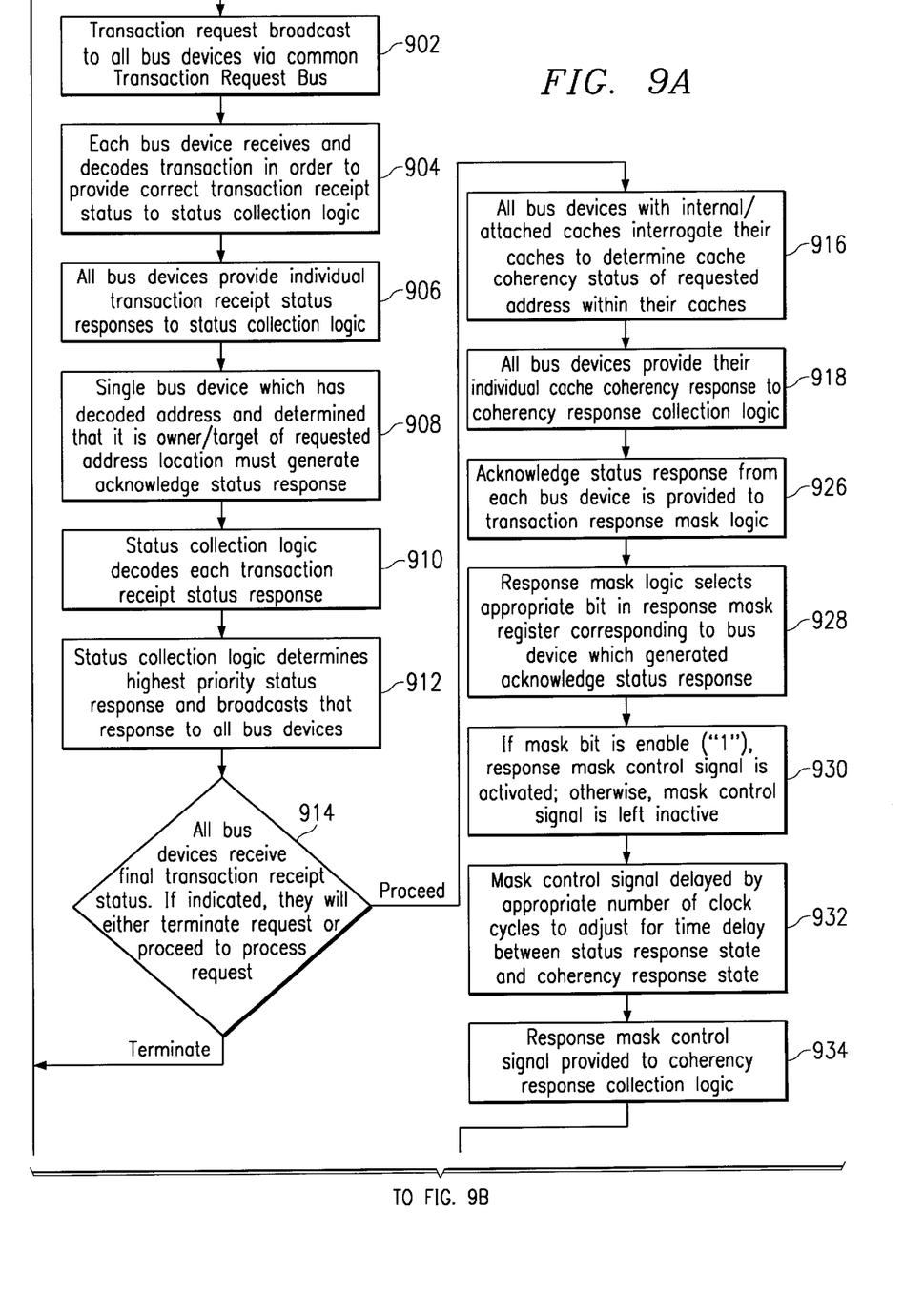
FIG. 9 depicts a flowchart illustrating a preferred method of implementing the present invention.
Figure 9B:
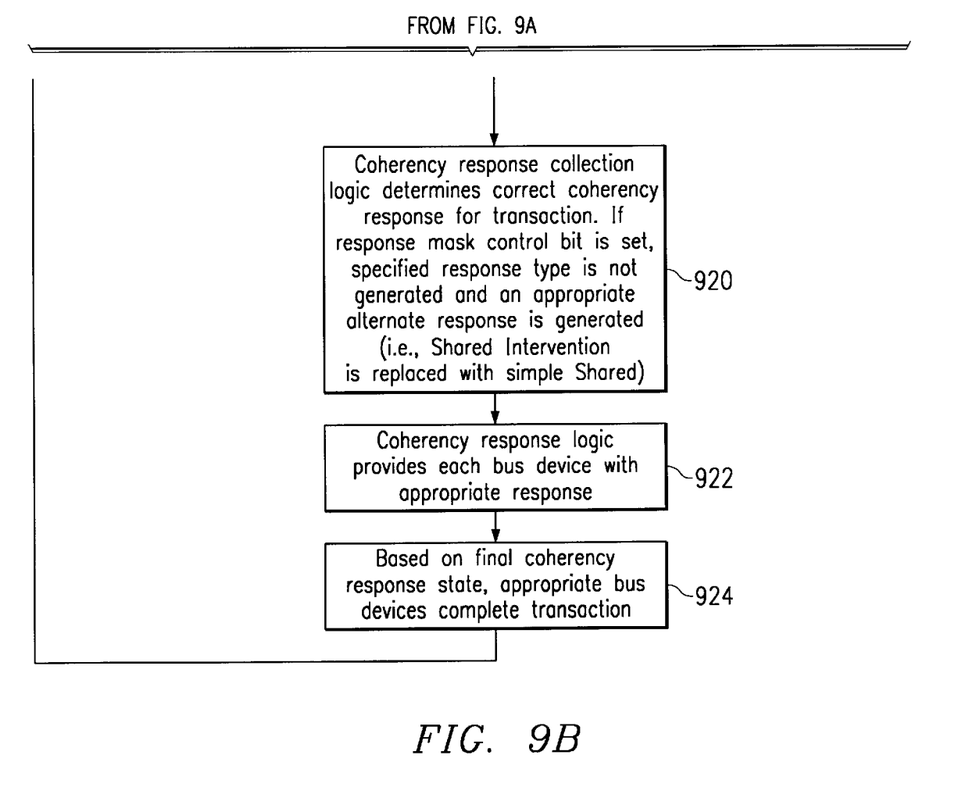

It is certified that error appears in the above-identified patent and that said Letters Patent is hereby corrected as shown below:

Column 2,
Line 16, delete "Fig. 9 depicts" and insert -- Figs. 9A-9B depict --.

Column 7,
Line 31, after "processors", delete "8.14" and insert -- 814 --.
Line 34, after "to", delete "Fig. 9" and insert -- Figs, 9A-9B --.

Column 8,
Line 20, after "transaction", insert -- (step 924) --.

Column 9,
Line 29, after "and", delete "Whether" and insert -- whether --.

Signed and Sealed this

Fifth Day of August, 2003

JAMES E. ROGAN
*Director of the United States Patent and Trademark Office*